Nov. 29, 1949  B. A. PARKER  2,489,431
POULTRY WATERING FOUNTAIN
Filed March 1, 1946  2 Sheets-Sheet 1
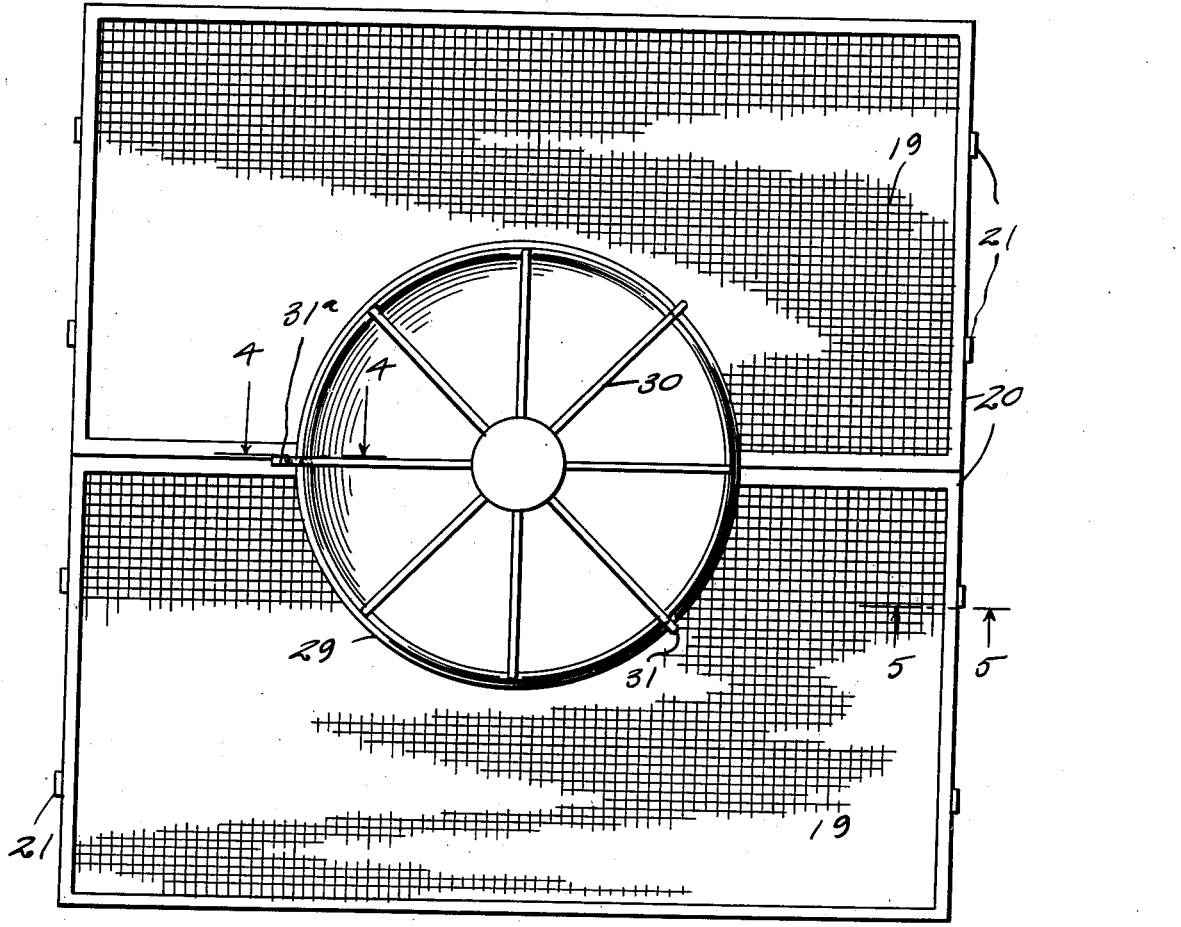
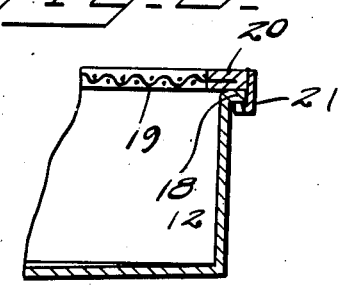
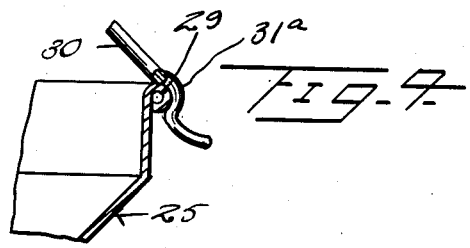
Inventor
B. A. Parker
By Randolph & Beavers
Attorneys Nov. 29, 1949 — B. A. PARKER — 2,489,431
POULTRY WATERING FOUNTAIN
Filed March 1, 1946 — 2 Sheets-Sheet 2
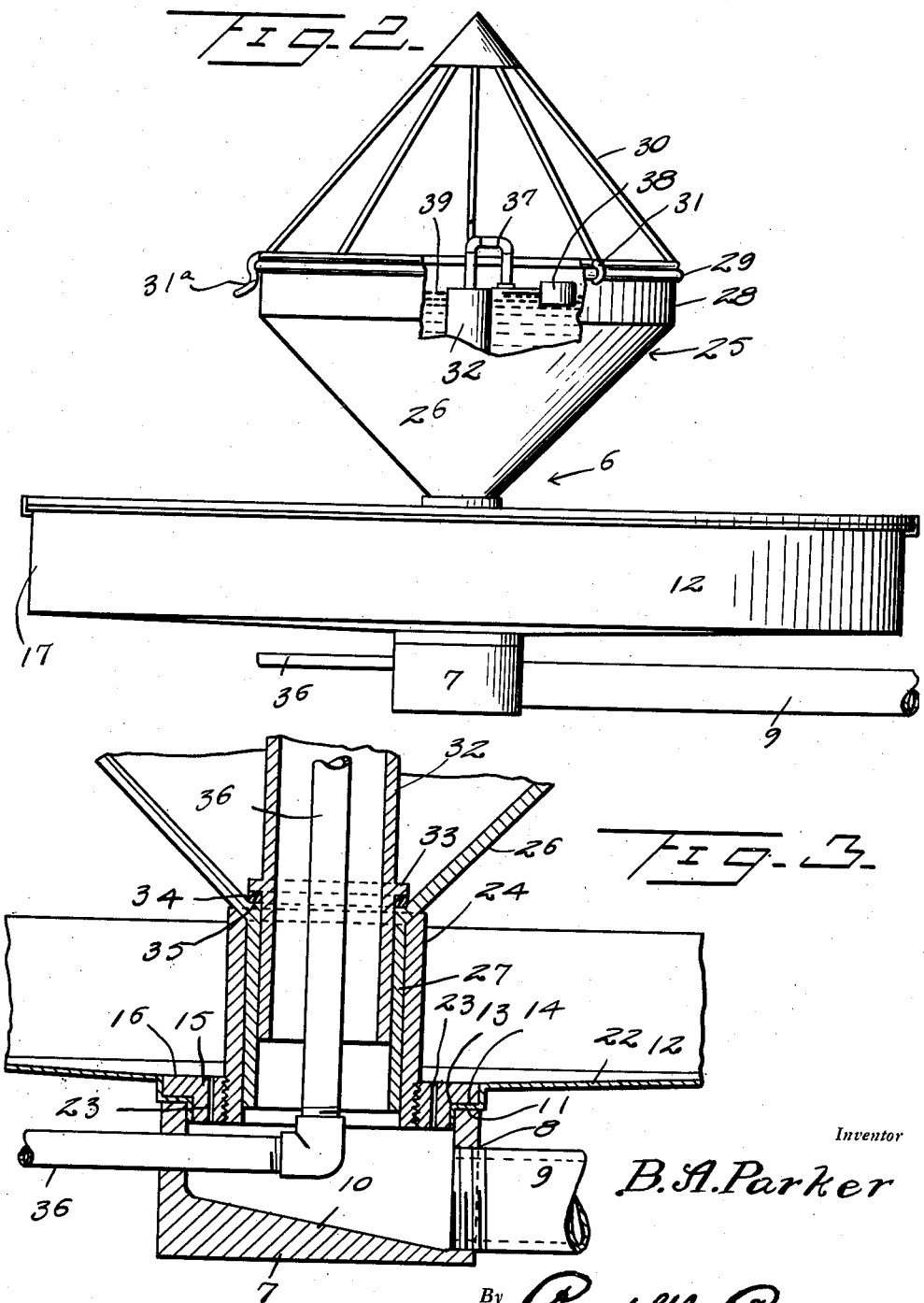
Inventor
B. A. Parker
By Randolph & Beavers
Attorneys Patented Nov. 29, 1949

2,489,431

UNITED STATES PATENT OFFICE 2,489,431

POULTRY WATERING FOUNTAIN

Bert A. Parker, Boone, Colo.

Application March 1, 1946, Serial No. 651,150

2 Claims. (Cl. 119—72)

This invention relates to an improved fountain for use in watering poultry and particularly to a novel construction of fountain capable of being readily cleaned and maintained in a sanitary condition.

A particular object of the invention is to provide a poultry watering fountain so constructed that it will more readily retain itself in a sanitary condition due to the fact that droppings from the fowl using the fountain will remain dry and consequently will not result in the spread of disease common to poultry.

A further object of the invention is to provide a fountain including a drinking bowl so constructed that the water contained therein may be readily drained therefrom and the drainage thereof will carry off any accumulation of dirt or impurities.

Other objects and advantages of the invention will hereinafter become more fully apparent from the following description of the drawings, which illustrates a preferred embodiment thereof, and wherein:

Figure 1 is a top plan view of the improved poultry watering fountain;

Figure 2 is a side elevational view, partly broken away, of the same;

Figure 3 is an enlarged fragmentary vertical sectional view of a portion of the fountain;

Figures 4 and 5 are enlarged detailed sectional views taken substantially along the plane of the lines 4—4 and 5—5 respectively, of Figure 1.

Referring more particularly to the drawings, wherein like reference characters designate like or corresponding parts throughout the several views, 6 designates generally the poultry watering fountain in its entirety.

The fountain proper includes a drain box 7 having an internally threaded opening 8 at one end thereof to receive the threaded end of a drain pipe 9. The drain box 7 is provided with a hollow interior having a bottom 10 which slopes toward the opening 8 and an open top 11, for a purpose hereinafter to be described. As best seen in Figure 3, a drain pan 12 is provided with a flanged opening 13 at the center thereof the depending flange of which extends into the open top of the drain box 7. A downwardly offset annular portion 14 of the drain pan 12 seats on the top of the drain box 7. A collar 15 seats in the flanged opening 13 and is provided with an annular outwardly projecting flange 16 which rests on the annular portion 14 for effectively securing the drain pan 12 on the box 7.

The drain pan 12 is provided with upstanding marginal walls 17 which terminate in an outturned flange 18 at its upper edge, as best seen in Figure 5. Two mesh wire fabric screens 19, which are mounted in frames 20, cover the open top of the pan 12. As seen in Figure 5, the frames 20 rest on the flanges 18 and are provided with downwardly projecting inturned retaining lugs 21 which may be secured thereto in any suitable manner and which engage under the flange 18 for detachably retaining the screens in position. It will be apparent that the screens 19 are slid away from each other for detaching them from the top of the pan 12. As best seen in Figure 2, the pan 12 is provided with a bottom 22 which slopes toward its flanged opening 13 and as seen in Figure 3, the collar 15 is provided with a plurality of drainage openings 23 forming conduits between the pan 12 and the interior of the box 7.

The opening of the collar 15 is threaded for threaded engagement with the lower end of a short length of pipe 24 which terminates just above the top of the pan 12 and around which the adjacent frame portion of the screen closely engages. A drinking container, designated generally 25, includes a frusto-conical intermediate portion 26 which terminates at its lower end in a tubular portion 27 which telescopes into the pipe 24. An annular upwardly projecting wall 28 forms a continuation of the upper, enlarged end of the conical portion 26 and is provided with a rolled rim 29. An inverted, cone shaped open work cage 30 is superimposed on the top of the container 25 and certain of the longitudinal bars thereof are provided with arcuate extensions 31 which resiliently engage over the bead 29 for detachably mounting the cage 30 thereon, as best illustrated in Figure 5. One of said arcuate extensions, designated 31a, is elongated to provide a finger hole to facilitate detaching the cage 30 from the rim 29.

As best seen in Figure 3, an overflow pipe 32 has its lower end telescoped into the tube portion 27 and is provided with a collar 33 which bears on a sealing ring 34 to support the overflow pipe 32 and to retain the ring 34 in sealing engagement with an annular seat 35 at the base of the conical portion 26 to form a liquid tight closure for the container 25. As best seen in Figure 2, the upper end of the overflow pipe 32 terminates below the top of the container 25. A water supply pipe 36, connected to any suitable source of water supply, not shown, extends through a wall of the box 7 and into the hollow interior thereof and is provided with an upwardly extending portion which extends upwardly through the pipe 32 to substantially above the upper end thereof. The upper end of the pipe 36 is turned back upon itself as seen at 37 in Figure 2. A float 38 pivotally connected to the open end of portion 37 and controlled by the liquid level 39 in the container 25, controls the inlet of water from the conduit 36 to the container 25 to normally maintain the liquid level slightly below the upper end of the pipe 32. It will be readily apparent that when the liquid level 39 drops below a predetermined point, the float 38 will drop so that the outlet end of the pipe 36 will be exposed to admit water to container 25 to cause the liquid level to resume the predetermined height. Likewise, if the liquid level becomes too high excess water will be carried off by the drain pipe 32 into the drain box 7 from whence it will drain off through the drain pipe 9.

The container 25 will permit fowl to drink therefrom without normally splashing any water out of the container so that any droppings or dirt from the fowl will fall through the screen 19 into the bottom 22 and thus be maintained in a dry condition and thereby avoid spreading of poultry diseases. On rare occasions when water is splashed from the container 25, it will drain toward the center of bottom 22 and be carried off through the passages 23 so as not to accumulate in the pan 12.

The length of the portion of the pipe 32 which telescopically engages tube 27 is less than the distance between the upper end of the pipe and the horizontal upper portion 37 of pipe 36. Consequently, pipe 32 can be raised to disengage it from the lower end of the tube 27, while holding the valve 38 closed to thereby rapidly drain the container 25. Due to the shape of container 25, dirt and impurities will be carried off when it is thus drained. By releasing the valve 38 with parts thus disposed, it is possible to efficiently flush out the container 25 which, however, is ordinarily not necessary.

When using this waterer in a poultry house already equipped with a floor drain, the drain box 7 can be mounted inside or directly over the floor drain, in which case the drain pipe 9 can be dispensed with. The waterer may also be used outdoors anywhere that poultry or turkeys are raised as on a range, by simply using a hole in the ground for a drain. By making the container 25 of different sizes and/or by varying the height of the liquid level 39, the poultry waterer can be adapted to fowls of different sizes and ages.

Various other modifications and changes are likewise contemplated and may obviously be resorted to without departing from the spirit and scope of the invention as hereinafter defined by the appended claims.

What I claim is:

1. In a poultry watering fountain, a drain box, a pipe projecting upwardly therefrom and having its lower end disposed therein, a water container having a tubular open bottom in telescoping engagement with the pipe, a tubular closure for the container bottom in telescoping engagement with said tubular open bottom of the water container, said closure being movable upwardly relatively to the container to permit the liquid contents thereof to be discharged through the tubular bottom portion when the closure is moved out of engagement therewith, and a drip pan supported by the drain box and disposed beneath and around the container, said drip pan having a slidably removable mesh wire fabric cover and a bottom sloping downwardly toward its center, a collar interposed between the lower end of the pipe and drain box, and drainage means in the collar communicating with the drip pan and with the drain box.

2. In a poultry watering fountain, a drain box, a pipe projecting upwardly therefrom, a water container having a tubular opened bottom in telescoping engagement with the pipe, a tubular closure for the container bottom in telescoping engagement with said tubular bottom portion of the container, said closure being movable upwardly relatively to the container to permit the liquid contents thereof to be discharged through the tubular bottom portion when the closure is moved out of engagement therewith, said tubular closure having an upper end opening adjacent the top of the container and providing an overflow conduit, a drip pan supported by the drain box and disposed beneath and around the container, and a collar interposed between the drain box and pipe and provided with drainage means communicating with the drip pan and with the drain box.

BERT A. PARKER.

REFERENCES CITED

The following references are of record in the file of this patent:

UNITED STATES PATENTS

| Number | Name | Date |
| --- | --- | --- |
| 401,640 | Connolly | Apr. 16, 1889 |
| 533,982 | Beaumont | Feb. 12, 1895 |
| 977,561 | Simmons | Dec. 6, 1910 |
| 1,254,937 | Ryon | Jan. 29, 1918 |
| 1,603,198 | Edington | Oct. 12, 1926 |
| 1,811,375 | Wysong | June 28, 1931 |
| 1,816,781 | Johnson | July 28, 1931 |
| 1,874,141 | Sueper | Aug. 30, 1932 |

FOREIGN PATENTS

| Number | Country | Date |
| --- | --- | --- |
| 26,327 | Denmark | July 12, 1920 |